C. W. GAGE.
BUTTER WORKER.
No. 17,564.  Patented June 16, 1857.
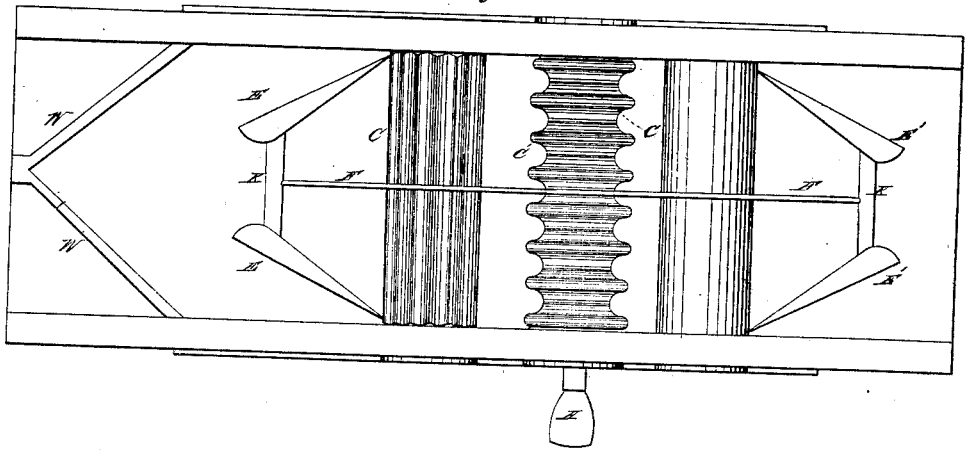
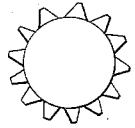
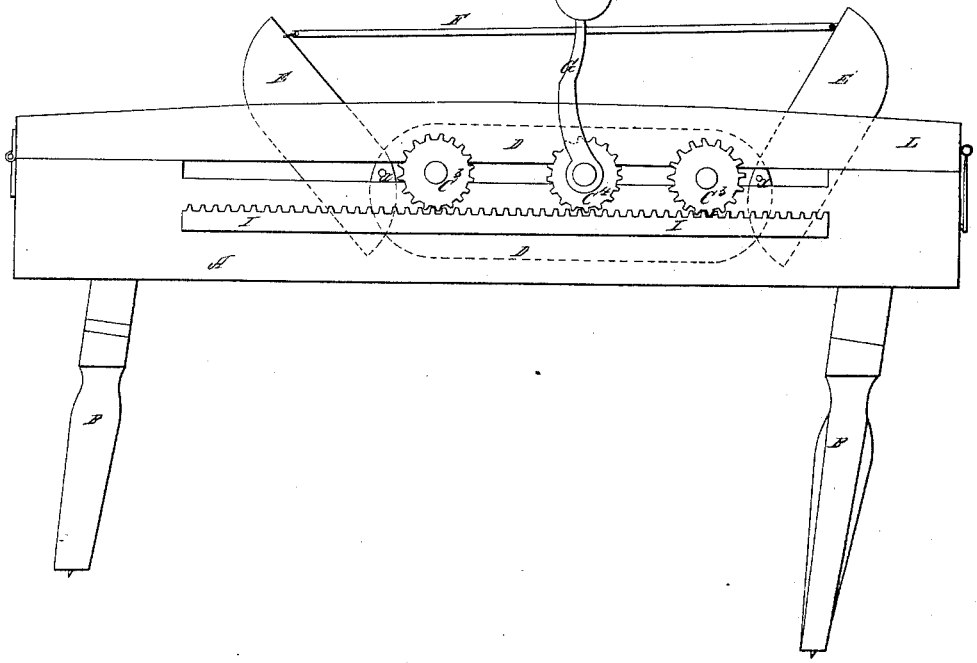

UNITED STATES PATENT OFFICE.

CHARLES W. GAGE, OF HOMER, NEW YORK.

BUTTER-WORKER.

Specification of Letters Patent No. 17,564, dated June 16, 1857.

*To all whom it may concern:*

Be it known that I, C. W. GAGE, of Homer, in the county of Cortland and State of New York, have invented certain new and useful Improvements in Butter-Workers; and I do hereby declare that the following is a full, clear, and exact description thereof, reference being had to the accompanying drawings and to the letters of reference marked thereon.

The nature of my invention consists in working butter by means of rollers corrugated longitudinally and vertically arranged with scrapers in such a manner that the butter is cut and pressed in three ways, by each passage of the rollers over it, while it is drawn by the scrapers following the rollers, into such a position, as again to be pressed, either in the forward or backward motion of the rollers.

In order that others skilled in the arts may manufacture and use my invention I will proceed to describe its construction and operation.

In the accompanying drawings which make a part of this specification Figure 1 is a side elevation. Fig. 2 is a plan view. Fig. 3 is an end view of rollers C seen in Figs. 1 and 2.

In Fig. 1 A is the frame of the machine, B the legs, D is a rack, $C^3$ $C^3$ and $C^4$ are pinions having journal bearings in frame D. D is a frame of sheet metal within the machine lining the sides as the rollers pass over the butter and forming journal bearings for the pinions, $C^3$ and $C^4$. E are wings or scrapers attached to D at the point $x$ by a pivot. F is a rod connecting the scrapers E and E'. G is a crank and H the handle. L is a bar hinged at the point $o$ for the purpose of keeping pinions $C^3$ $C^4$ in their position.

In Fig. 2 A is the frame, C C are rollers corrugated longitudinally. C' is a roller corrugated vertically and working between the rollers C. E E' are the scrapers attached to each end of D seen in Fig. 2. K is a cross bar connecting scrapers E, at each end, together. F is a rod attached to bars K and connecting scrapers E to scrapers E'. H is a handle. W, W, are troughs for conveying away the milk after it is pressed from the butter.

In the operation of this invention the butter is placed in the machine in front of the rollers, the scrapers E' at the back of the rollers are then lowered and by means of handle H, the rollers C and C' are made to pass over the butter, as said rollers pass over the butter cutting and pressing it, it is scraped up *en masse* by scrapers E' and carried after the rollers to the back end of the machine. Scrapers E are then lowered thus elevating E' and a contrary motion given to the rollers, the butter being again in front of them it is pressed and again brought to the forward end of the worker by scrapers E. This operation is performed as often as the state and condition of the butter may require. After the milk is all removed by this operation the butter may be removed from the worker and a new lot put in.

There is a great advantage arising from having two rollers corrugated longitudinally and one vertically and arranged in the manner in which I have them. The first roller C cuts the butter in one direction, C' cuts it in a different manner and C again cuts it differently—thus I have three different cuts for the butter each pressing out the milk equally well.

The scrapers E and E where they are joined together by bars K need not be brought very close to each other, as the butter will lie in a mass, leaving none behind by the space between E E and E' E'.

It will be seen that the pinions $C^3$ $C^3$ seen in Fig. 1 may be dispensed with since their journals work in the sliding frame D, seen in dotted line.

A rack on each side and a pinion on each end of the shaft running through the center roller $C^4$ are all that it is necessary to use in revolving the rollers. I may use them with or without their pinions.

The sliding frames D serve a double purpose—they connect the three rollers and at the same time prevent the butter or milk getting in the slots which the ends of the rollers traverse in their movement from one end of the machine to the other.

The rollers being attached in the frame D and the scrapers being attached to said frame all together may be removed when it is desired to take out the butter when worked to put in a fresh supply of unworked, thus making a convenient and desirable arrangement for the purposes within specified.

Having thus fully described my invention what I claim as new and desire to secure by Letters Patent is—

The combination of rollers C C and C', with scrapers E and E' connected and operating in the manner and for the purpose herein set forth and described.

C. W. GAGE.

Witnesses:
L. M. ROBINSON,
GEORGE W. PHILLIPS.